United States Patent [19]

Johnson et al.

[11] 4,428,775

[45] * Jan. 31, 1984

[54] REINFORCED CEMENT SHEET PRODUCT CONTAINING NO ASBESTOS FOR FABRICATING ON HATSCHEK MACHINE

[75] Inventors: Robert M. Johnson; Elmer M. Melling, both of Kenmore, N.Y.

[73] Assignee: National Gypsum Company, Dallas, Tex.

[*] Notice: The portion of the term of this patent subsequent to Dec. 14, 1999 has been disclaimed.

[21] Appl. No.: 233,663

[22] Filed: Feb. 11, 1981

[51] Int. Cl.³ .............................................. C04B 7/35
[52] U.S. Cl. ..................................... 106/90; 106/93; 106/99
[58] Field of Search .................... 106/97–99, 106/120, 90, 93

[56] References Cited

U.S. PATENT DOCUMENTS

| | | | |
|---|---|---|---|
| 3,645,961 | 2/1972 | Goldfein | 106/99 |
| 3,716,386 | 2/1973 | Kempster | 106/99 |
| 3,753,749 | 8/1973 | Nutt | 106/99 |
| 4,040,851 | 8/1977 | Zeigler | 106/99 |
| 4,101,335 | 7/1978 | Barrable | 106/99 |
| 4,111,710 | 9/1978 | Pairaudeau et al. | 106/99 |
| 4,132,555 | 1/1979 | Barrable | 106/120 |
| 4,199,366 | 4/1980 | Schaefer et al. | 106/99 |

*Primary Examiner*—James Poer
*Attorney, Agent, or Firm*—Joseph P. Gastel

[57] ABSTRACT

A fiber-cement product which is capable of being formed on a Hatschek machine consisting essentially of a Portland cement binder in the amount of between about 40% and 80% by weight, natural and/or synthetic fibers in an amount of between about 1% and 15% by weight, clay in an amount of between about 2% and 15% by weight, and poly(ethylene oxide) homopolymer in an amount of between about 0.03% and 0.5% by weight. The product may also contain silica and/or filler in an amount of between 10% and 40% by weight. The silica is generally used in a product which is to be autoclaved. The filler may be waste fiber-cement product or inert filler material.

67 Claims, 3 Drawing Figures

REINFORCED CEMENT SHEET PRODUCT CONTAINING NO ASBESTOS FOR FABRICATING ON HATSCHEK MACHINE

BACKGROUND OF THE INVENTION

The present invention relates to a reinforced cement sheet product which does not contain asbestos and which can be fabricated on a Hatschek machine.

By way of background, in the past asbestos-cement compositions have been formed into sheets on a Hatschek machine for subsequent formation into such products as siding shingles, flat sheets, corrugated sheet products, and the like. These sheets generally contained Type 1 Portland cement binder in the amount of about 58%, silica and/or filler in the amount of about 27%, and asbestos fibers in the amount of about 15%. The products had many desirable qualities including high strength, and exterior durability, easy application, and ability to be colored in various colors. In addition, the existence of the asbestos permitted the product to be formed expediently and economically on a Hatschek machine. However, in recent years governmental regulations have restricted the use of asbestos due to its carcinogenic effects. Therefore, attempts have been made to find substitutes for asbestos. One such attempt is disclosed in U.S. Pat. No. 4,040,851 which utilizes cotton fibers instead of asbestos fibers, along with other components in addition to Portland cement and silica. However, in the past it has been found that formulas containing asbestos substitutes do not have the properties of asbestos which are conducive to the expedient formation of the desired product on a Hatschek machine. More specifically, it has been found that cement and silica and/or filler slurry containing fibers other than asbestos will not form properly on the cylinder of a Hatschek machine for two reasons, namely, (1) there is too rapid a drainage of water from the non-asbestos mat which is formed on the Hatschek cylinder and (2) there is an excessive loss of cement and silica and/or filler fines thru the cylinder screen which causes problems in handling the discharge water in the normal recirculating system and which causes the resulting product to have reduced strength. It has also been found that various synthetic fibers, such as polyethylene, polypropylene, etc. and some natural fibers cannot be used instead of asbestos because they will not disperse properly in the cement-silica water slurry. In this respect, they tend to float to the top of the slurry because they have a lower specific gravity than water, and therefore they will not form a homogeneous mat on the cylinder of a Hatschek machine. It is with overcoming the foregoing problems that the present invention is concerned.

SUMMARY OF THE INVENTION

It is accordingly one important object of the present invention to provide fiber-cement products which are capable of being formed on existing Hatschek machines in a highly expedient and commercial manner.

Another object of the present invention is to provide improved fiber-cement products containing no asbestos and which have highly desirable strength and durability properties.

A further object of the present invention is to provide a modification of an existing Hatschek machine which will enable it to be used expediently in the manufacture of fiber-cement products which do not contain asbestos.

Other objects and attendant advantages of the present invention will readily be perceived hereafter.

The improved fiber-cement product of the present invention comprises a Portland cement binder in an amount of between about 40% and 80% by weight, fibers in an amount of between about 1% and 15% by weight, clay in an amount of between about 2% and 15% by weight, and poly(ethylene oxide) homopolymer in an amount of between about 0.03% and 0.5% by weight. Mixtures of various fibers may be used to obtain special properties. The product may also contain silica and/or filler in an amount of between 10% and 40% by weight. The filler may be waste fiber-cement product or inert filler material. If the product is to be autoclaved, silica is used by itself or in combination with filler.

The modified Hatschek machine of the present invention comprises a cylinder vat, a cylinder in said vat, a surface on said cylinder, and partition means in said vat for confining a predetermined depth of slurry to engagement with a predetermined portion of said surface which is less than the amount of surface which would normally be engaged by said slurry of the same depth in said vat in the absence of said partition means. The various aspects of the present invention will be more fully understood when the following portions of the specification are read in conjunction with the accompanying drawings wherein:

DESCRIPTION OF THE PREFERRED EMBODIMENTS

Figure 1:
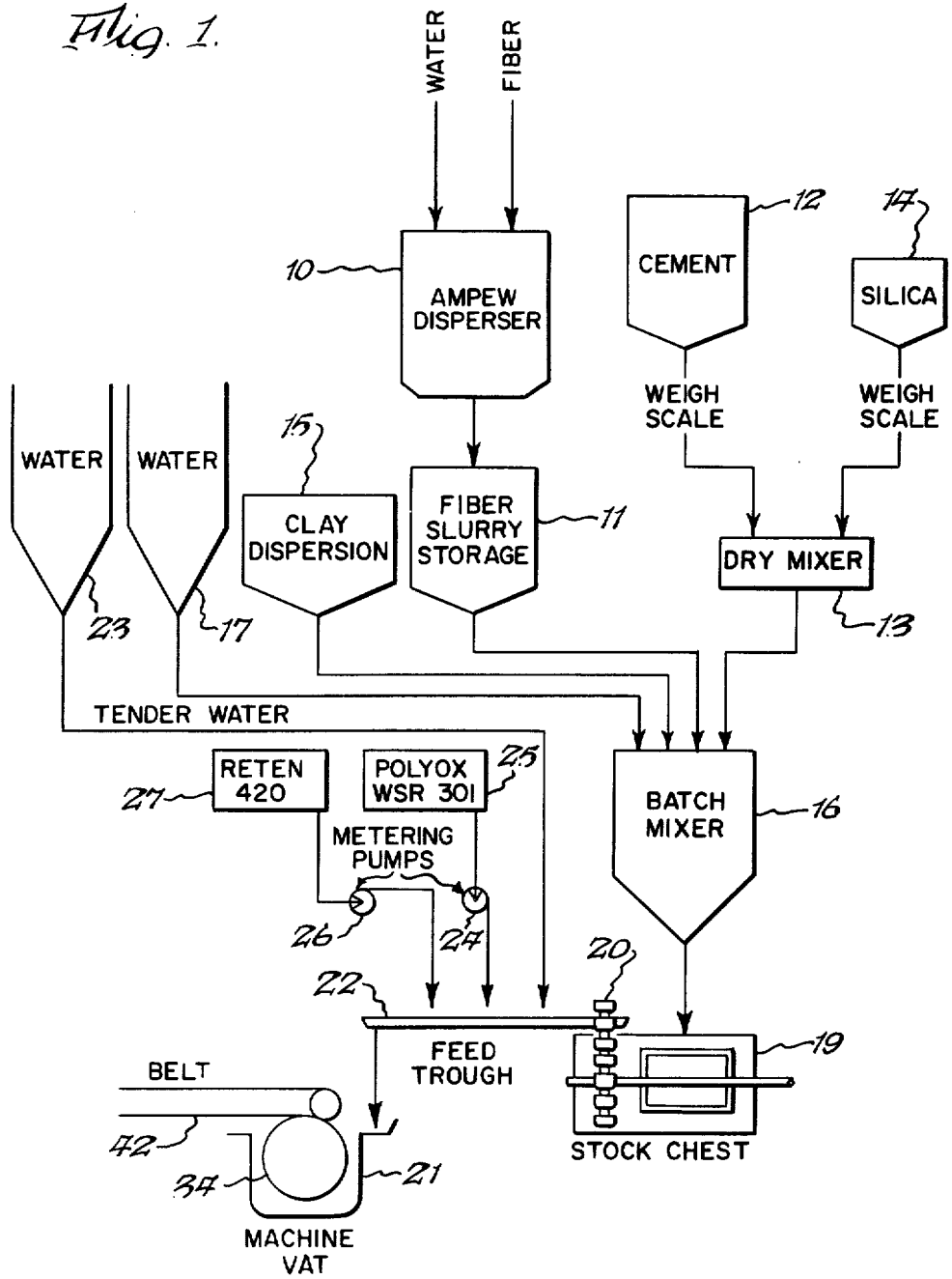
FIG. 1 is a schematic material flow diagram for practicing the present invention on a Hatschek machine.

The improved fiber-cement product of the present invention is a fiber reinforced cementitious hydrated reaction product of a cured mixture of Portland cememt, fibers, clay and poly(ethylene oxide) homopolymer. The product preferably also includes filler as a matter of economy, but it can be made without filler. The filler may be reground waste fiber-cement product or inert fillers. If the product is to be autoclaved, silica is added by itself or in combination with filler. The product, as noted above, is intended to be used for the same purposes as asbestos-cement products, namely, as siding for houses, roofing, slabs, corrugated sheets, flat sheets, and the like.

It is preferred that Type I Portland cement be used, byt Type II or any other conventional type may be used. The cement may be present in an amount of between about 40% and 80% by weight, and more preferably between about 45% and 75% by weight, although the most preferred range is between about 55% and 65% by weight where silica and/or filler is used.

Fillers may form a part of the composition. The fillers may be inert substances, such as reground product, calcium carbonate, wollastonite ($CaSiO_3$) or any other suitable substance. If the product is to be autoclaved, silica is used by itself or in combination with filler. The silica and/or filler which is used is preferably 120 mesh but can be any other suitable mesh size between about 80 mesh and 325 mesh. The silica and/or filler can be present in the amount of between about 10% and 40% by weight, and more preferably between 15% and 35% by weight, but the most preferred range is between 20% and 35% by weight.

Fibers which have been used successfully in the laboratory to prepare fiber-cement sheet products in accordance with the present invention are sisal, hemp, rami, jute, kraft, glass, alumina (KAOWOOL), carbon, mineral fiber, polypropylene, cotton, and aramid (KEVLAR). Also acetalized polyvinyl alcohol fiber (KURALON) has been used as an ingredient of a product made on a Hatschek machine. Each of the foregoing fibers, as well as the other fibers specifically discussed heretofore, can be combined with Portland cement, clay, and poly(ethylene oxide) for processing on a Hatschek machine. Where the fiber is autoclavable, silica may be added by itself or in combination with filler. Any of the foregoing fibers, except KURALON which is discussed in greater detail hereafter, may be present in an amount of between about 1% and 15% by weight, and more preferably between about 2% and 10% by weight, and most preferably between about 5% and 7% by weight.

In one formulation in accordance with the present invention which was fabricated on a Hatschek machine, where the product was to be autoclaved, cotton fibers of the type known as Hercules cotton linter PS-31 were used. This cotton has approximately 2500 fibrils per linear inch, and a weighted average fiber length of 2.3 millimeters, although other suitable cotton fibers can be used. The cotton may be present in the amount of between about 1% and 15% by weight, and more preferably between about 3% and 10% by weight, although the most preferred range is between about 5% and 7% by weight. The cotton fibers serve the function of providing a fibrous nature to the finished product, to thereby provide strength. Polypropylene fibers may be added to improve the impact resistance of the product. The fibers are between about ⅛ and ¼ inch long and of about 3 denier size. However, their size may range between about 1 and 4 denier. The polypropylene fibers mix well with the cotton fibers and provide impact strength to the finished product. The polypropylene fibers may be present in an amount of between about 0.1% and 3% by weight and more preferably are present in the amount of between 0.3% and 2% by weight and most preferably between about 0.5% and 1% by weight. It is to be noted that some polypropylene fibers are autoclavable under certain conditions whereas other generally used synthetic fibers are not.

In another formulation in accordance with the present invention which was formulated on a Hatschek machine, acetalized polyvinyl alcohol fibers were used, as set forth in the specific example shown hereafter. The fibers which were used are known under the trademark KURALON VPB 103. However, the product known as KURALON VF 5501 is preferred. Both products are acetalized polyvinyl alcohol fibers and are fully described in the publications "KURALON Polyvinyl Alcohol Fibre—General Information Products and Characteristics" and "KURALON Technical Service Manual, Book 1." Both of the foregoing documents are published by the Kuraray Company, Ltd. of Osaka, Japan, the manufacturer of the above products, and these documents are incorporated herein by reference. As noted above, the KURALON VF 5501 is preferred, and by way of example, it has the following physical properties. Standard elongation between about 5.5% and 7.1%; standard Youngs modulus between about 195 and 295 g/d; wet shrinkage (100° C.×30 min) between about 0.5% and 3.5%; heat shrinkage (160° C.×30 min) between about 0% and 0.5%; creep (1 g/d 100° C.×60 min) between about 0.5% and 2.0%; specific gravity between about 1.26 and 1.30; and moisture absorbancy (30° C. 65% RH) between about 2% and 5%. The fibers may have a length of between 2 mm. and 12 mm., and a thickness of between 0.5 denier and 6 denier. The acetalized polyvinyl fibers may be present in an amount of between about 1% and 15% by weight, and more preferably between about 2% and 10% by weight, and most preferably between about 2% and 5% by weight.

As will be seen hereafter, the polyvinyl alcohol fibers provide great strength to the products. In fact, this fiber gives strength which is comparable or superior to that of asbestos-cement products. However, this fiber is not autoclavable.

In either formulation (autoclave or normal cure) the clay which is used is Attapulgus type which is known commercially as Engelhard X2059. However, other clays are satisfactory. These clays include bentonite and kaolin types and Bentone Lt, Attagel 40, Minngel FG, and Imvite IGBA. The clay is used (1) for the purpose of keeping the fibers in suspension during the sheet formation process and (2) for the purpose of combining with the poly(ethylene oxide) to increase drainage time and decrease solids loss. The clay may be present in an amount of between about 2% and 15% by weight, and more preferably between about 3% and 10% by weight, and most preferably between about 4% and 7% by weight.

The poly(ethylene oxide) homopolymer which is preferred is known under the trademark POLYOX WSR-301. It is a water soluble resin which is nonionic. It has a molecular weight of approximately 4,000,000 and a viscosity range at 25° C., in a 1% solution of 1650–3850 cps and a Brookfield Spindle No./Speed, rpm of ½. This product is a proprietary product of the Union Carbide Corporation and is described in detail in its various publications including the pamphlet "POLYOX Water-Soluble Resins are Unique" published in November of 1978, which is incorporated herein by reference. The POLYOX WSR-301 is a thickening agent. It also causes rapid flocculation of the mixture of the clay, cement and the fiber. In addition, other grades of poly(ethylene oxide) can be used in the same range. These grades are POLYOX WSR-1105 having a molecular weight of 900,000 and POLYOX WSR-Coagulant having a molecular weight of 5,000,000. Thus, poly(ethylene oxide) having a molecular weight in a range of between about 900,000 and 5,000,000 can be used. All of the above grades of POLYOX are described in detail in the above publication and they have the common structure $(O-CH_2CH_2)_n$.

The use of poly(ethylene oxide), as described above, in combination with the clay results in the retention of the cement fines and fines (of silica and/or other fillers) during the sheet forming process. It has been found that without the use of the poly(ethylene oxide) in combination with the clay, a sheet could not be formed on the Hatschek machine because the water filtered through the screens of the Hatschek machine so that a high amount of cement fines and silica and/or filler fines were lost. This loss of fines resulted in a weaker product, and, in addition caused the drainage water to be contaminated so that it could not be recirculated for a reasonable operating time in the sheet-forming process.

Thus, while the poly(ethylene oxide) is normally a thickening agent, when it is used in combination with the clay, as noted above, it results in the thorough flocculation of the mixture which in turn results in both the retention of the fines and the maintaining of the drainage water sufficiently clear so that it can be recirculated. It has been found that the use of clay alone or poly(ethylene oxide) alone would slow down the drainage but when either was used alone, the drainage water from the Hatschek machine contained cement fines and silica and/or filler fines which were lost from the mat being formed on the cylinder of the Hatschek machine. However, when the clay and the poly(ethylene oxide) are used together they not only slow down drainage so as to result in expedient formation of the mat, but they also cause rapid flocculation of the slurry so as to result in retention of the cement fines and silica and/or filler fines in the mat. This retention results in a stronger product and also causes the drainage water to be clear and therefore reusable. In addition the clay and poly(ethylene oxide) in combination aid in providing a homogeneous dispersion of fibers which have a different specific gravity than the slurry for preventing them from floating to the top or settling toward the bottom.

The poly(ethlene oxide) can be present in the amount of between about 0.03% and 0.5% by weight, and a more preferred range is between about 0.04% and 0.3% by weight, but the most preferred range is between about 0.05% and 0.1% by weight. In addition, as will appear hereinafter, as a refinement, a nonionic flocculent may be added as the slurry is being fed from the stock chest to the Hatschek machine. It has been found that the addition of the product known under the trademark RETEN 420 may be added to improve the flocculation characteristic. The RETEN 420 is a proprietary product of Hercules, Inc. and is a nonionic, high molecular weight, synthetic, water soluble copolymer of acrylamid and betamethacryloxyethltrimethylammonium methyl sulfate. This product may be present in an amount of between about 0.01% and 0.03% by weight and more preferably in an amount of about 0.01% by weight.

The dramatic effect of a composition containing a combination of poly(ethylene oxide) and clay with respect to low solids loss and proper drainage time can be seen from a comparison with a composition which contains asbestos, and a comparison with a composition which contains either clay or poly(ethylene oxide), as set forth in the following table:

| DRAINAGE TIME AND PERCENT SOLIDS LOSS FOR VARIOUS COMPOSITIONS | | | | |
|---|---|---|---|---|
| | FORMULATIONS (IN % BY WEIGHT) | | | |
| Cement | 57.5 | 55.4 | 56.6 | 60.4 |
| Silica | 31.9 | 30.8 | 31.4 | 33.5 |
| Asbestos | 0 | 13.8 | 0 | 0 |
| Cotton | 5.1 | 0 | 5.1 | 5.4 |
| Polypropylene | 0.6 | 0 | 0.6 | 0.6 |
| Clay | 4.8 | 0 | 6.3 | 0 |
| Polyox 301 | 0.1 | 0 | 0 | 0.1 |
| Reten 420 (flocculant) | 0.01 | 0 | 0.01 | 0.01 |
| Hydraid 771 (flocculant) | 0 | 0.01 | 0 | 0 |
| Drainage Time (Seconds) | 34 | 46 | 65 | 16 |
| % Solids Loss | 0.6 | 1.78 | 6.2 | 10.8 |

All of the above examples were tested by comparable acceptable standard laboratory methods which simulate filtration and fines retention properties of a Hatschek operation.

The samples which were tested for drainage time and solids loss were prepared and tested as follows: A weighted amount of fiber was predispersed in 1,000 milliliters of water in a Waring blender at low speed for 1 minute. The fiber dispersion was transfered to a beaker fitted with a laboratory-type propeller mixer. The dry ingredients (cement and/or filler) and the clay, as a water dispersion were added to the beaker with agitation and the resultant slurry was agitated for 2 minutes. 15 seconds before cessation of agitation, the required amount of poly(ethylene oxide) was added as a solution. The flocculant was also added as a solution 5 seconds before cessation of agitation. The resultant slurry was poured into a standard Rotap 8-inch diameter 50 mesh sieve and subjected to a vacuum of 2½ inches of mercury. The drainage time was taken as the point of vacuum break. The discharge water was collected and the solids loss in the discharge water was measured.

The fiber-cement boards of the present invention, such as those of Example 1, containing a mixture of cotton and polypropylene fibers, have been fabricated on a Hatschek machine. Referring to FIG. 1, the first step is to place the cotton linters and water into Ampew pulper 10 in the ratio of 1% solids to 99% water. The cotton fibers are in the form of sheet pulp, namely, Hercules cotton linter PS-31. Thereafter precut polypropylene fibers of about 3 denier size and between about 3/16 and ¼ inches long are added in an amount of approximately ⅛% by weight of the entire solution. Thus, the ratio of cotton to polypropylene is 8:1. The mixture is agitated with the Ampew blades for approximately thirty minutes. Thereafter, after mixing, the mixture is passed through the screen on the bottom of the tank. There is an unique relationship between the cotton fibers and the polypropylene in that whereas the polypropylene would not ordinarily disperse in water, the existence of the cotton causes dispersion because the cotton has a specific gravity which is very close to water, and this retains the polypropylene dispersed in solution because the polypropylene is prevented from floating up to the top. The cotton fibers mix with the water, and they bind the polypropylene so that it does not float upwardly. Thus, the cotton is not only used for its ultimate objective of providing a fibrous structure to the finished fiber-cement product, but it also produces good dispersement of the polypropylene because it acts as a dispersing medium. The aqueous mixture of cotton and polypropylene is then passed to fiber slurry storage tank 11.

Portland cement is taken from storage bin 12, weighed and passed to dry mixer 13. The silica, of the type described above, is taken from bin 14, weighed and also passed to dry mixer 13 where it is intimately mixed with the cement in the proper proportion. A 10% clay slurry is made up in mixing tank 15. Thereafter, the cement-silica dry mix from dry mixer 13, the fiber-slurry mix from tank 11, and the clay dispersion from tank 15 are all fed to batch mixer 16, along with a required amount of water from storage tank 17 to provide a slurry of approximately 10% solids. The mixture in the batch mixer 16 is thoroughly mixed by a recirculating pump and thereafter fed to stock chest 19. Thereafter, the bucket feed 20, which is conventional in the use of a Hatschek machine, feeds the slurry from stock chest 19 to the cylinders 21 of the Hatschek machine through feed trough 22. As the slurry is fed through feed trough 22, tender or dilution water is fed into the slurry from water storage tank 23. The water is added in sufficient amounts to provide proper consistency to the slurry in Hatschek cylinder tanks 21 to maintain the proper pickup on the screen. The amount of water which is added is determined by the Hatschek machine operator. In addition, the poly(ethylene oxide), in this instance POLYOX WSR-301, is metered into the feed trough 22 by metering pump 24 from the poly(ethylene oxide) storage tank 25. As noted above, it is the combination of the poly(ethlylene oxide) and the clay which causes flocculation of the slurry and the retention of fines of cement and silica, and also results in the proper formation of the mat on the cylinder because the thickening action also restricts the rapid passage of water through the cylinder screen and also through the mat, after forming on the screen. The poly(ethylene oxide) may be supplied in a sufficient amount to provide consistency of the slurry and proper drainage. The exact amount is determined by the Hatschek machine operator based on apparent dryness of the mat being transferred from the cylinder screen to the felt. The RETEN 420 may also be supplied to feed trough 22 through metering pump 26 from storage tank 27 in a small amount necessary to make the drainage water relatively clear. The RETEN acts as a refining flocculent, but other flocculents which are generally used in a Hatschek operation can be used. The use of refining flocculents, such as RETEN is optional, as it is not needed under certain circumstances.

Figure 2:
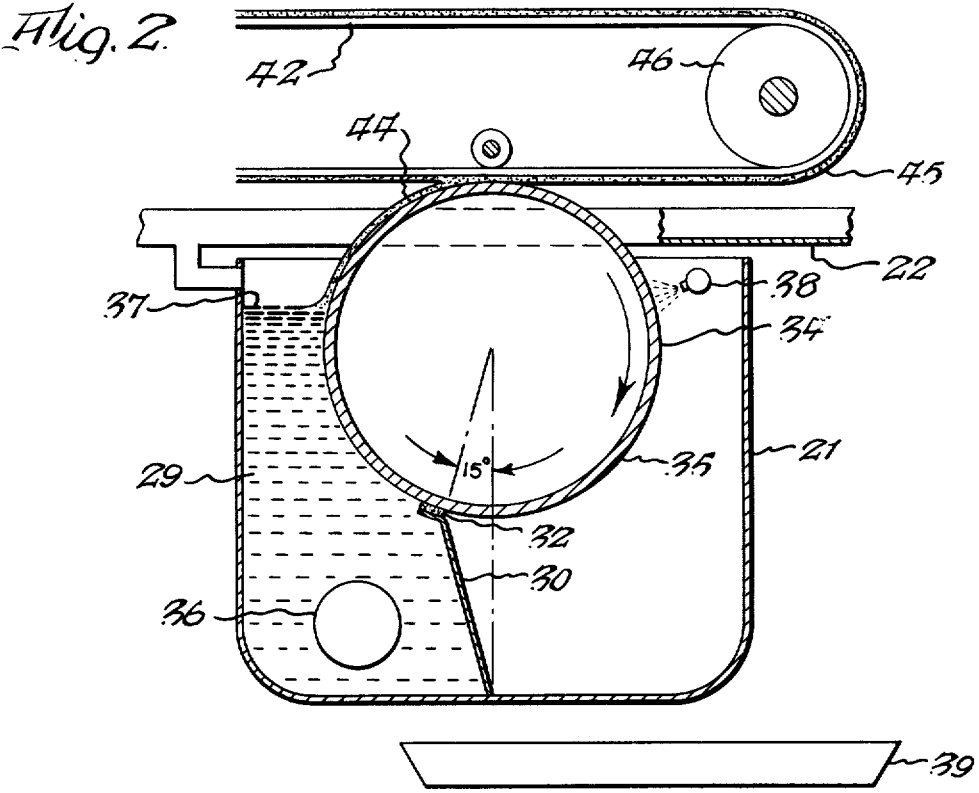
FIG. 2 is a schematic diagram showing how the cylinder vat of a Hatschek machine is blocked off for most expedient production of fiber-cement products in accordance with the present invention.

A further refinement of operating with this non-asbestos slurry is by blocking off approximately 60% of the cylinder vat as illustrated in FIG. 2. This provides less area of cylinder screen for the slurry to drain or dewater while in the cylinder vat. The slurry containing the additives is conducted by feed trough 22 into machine vat 21 and is confined in chamber 29 (FIG. 2) defined by plate or partition 30 having seal 32 at the end thereof in engagement with the outer surface 34 of cylinder 35. Plate 30 and seal 32 extend from end to end of tank 21 so that the slurry is totally confined within chamber 29. The lower seal is displaced from the vertical approximately 15°, as shown. A mixer 36 maintains the slurry in homogeneous suspension in chamber 29. In the normal operation of a Hatschek machine, where the cylinder vat is not blocked off, the slurry is usually maintained to a level 37 on both sides of the cylinder 35. In the modification of FIG. 2, this same level is maintained on one side of the cylinder screen after the vat has been blocked off, in order to maintain a sufficient hydrostatic head for proper mat formation. In addition, normally a 40-50 mesh screen forms the outer surface of cylinder 35. It has been found that better mat formation with the non-asbestos slurry is obtained with a 70 mesh screen, which further slows down the drainage through the cylinder screen. A spray manifold 38 applies wash water to clean the cylinder screen after the mat has been transferred to the felt, and the wash water drops into the vat from which it drains to drainage pit 39.

During the formation of the mat, which is approximately 0.025-0.030 inches thick, on cylinder 35, a certain amount of water will drain through screen 34 into the inside of cylinder 35 and this drainage water is conducted to drainage pit 39 from whence it is recirculated to save-all tanks 17 and 23 from which it is supplied for various process purposes, as described above. The water which is thus received in pit 39 is substantially clear and does not have any appreciable amount of cement or silica fines, because of the fact that the combination of clay and the poly(ethylene oxide) prevent the cement and the silica from passing through the screen. It has been found that the addition of the clay without the poly(ethylene oxide) does reduce the rate of filtration of the water through the screen but, as noted above, the use of clay alone permits too large a quantity of fines of silica and cement to filter through the screen during the mat forming process. The addition of the poly(ethylene oxide) to the clay thickens the slurry to adequately slow the drainage and unexpectedly causes the above-described thorough rapid flocculation which results in the water which filters through to be substantially clear.

The combination of the poly(ethylene oxide) and the clay produce a dramatic saving of fines which is not achievable by either component acting individually. As noted above, it was found that clay alone or poly(ethylene oxide) alone would slow down drainage, but when either was used alone, the drainage water contained fines which were lost from the mat. However, when the clay and poly(ethylene oxide) were combined, not only did they slow down drainage so as to make the process operable on a Hatschek machine, but they also caused the drainage water to be substantially clear, thereby showing that there had been practically no loss of fines from the mat. The practical effect of obtaining clear water is that the cement and silica fines (and filler-fines, if filler is used) are retained in the mat, and such retention is necessary for the strength of the product. An added advantage of retaining the fines is that the drainage water which goes to the save-all tank is relatively clean and therefore can be reused. If it was not clean, that is, if it contained more fines of cement and silica and/or filler, it could upset the balance of the system when it was reused, as described above, in the formation of the slurry. A further advantage of the use of the poly(ethylene oxide) and the clay is that it causes a thicker mat to be formed per unit of time, thereby providing relatively fast production.

Figure 3:
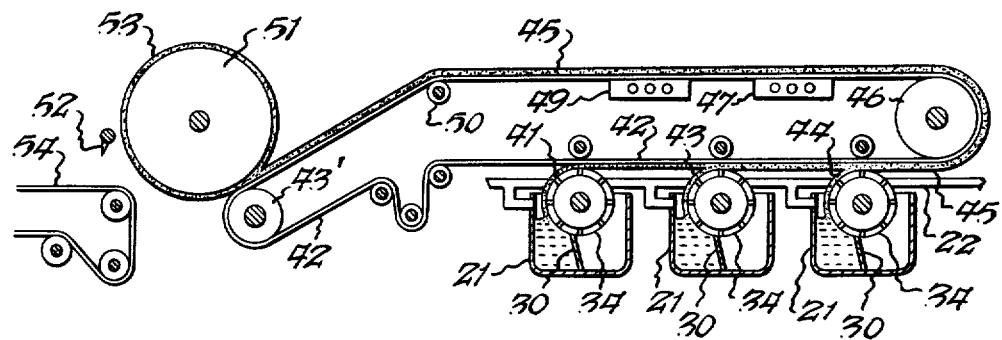
FIG. 3 is a schematic diagram showing various components of the Hatschek machine.

Normally, three cylinder vats 21 are used as schematically shown in FIG. 3 to provide a three-ply laminate. In this respect, the mat 41 which is formed on cylinder 34 at the left is picked up on the underside of an endless moving felt belt 42 which carries mat 41 past the next cylinder 34 where it picks up mat 43 to provide a two-ply laminate, and thereafter felt belt 42 moves the laminate 41-43 to pick up the third ply 44 from the next cylinder 34, and thus a three-ply laminate 45 is produced which is carried on belt 42 around roll 46 and past suction boxes 47 and 49 where excess water is sucked from mat 45. The felt 42 thereafter passes around transition roll 50 and is picked up by accumulator roll 51. Thereafter, the felt belt 42 passes around transition roller 43' to pick up three additional mats from the three cylinders on which the mats are formed, as described above. The layer of material is transferred to accumulator roll 51 as a result of the pressure exerted by the opposition roll 43. The layer of material 45 readily adheres to the accumulator roll or to a previous wrap of material, as the case may be. Any reasonable number of layers of material may be built up on the accumulator roll 41. When the desired thickness of material on the accumulator roll has been reached, a knife 52 is actuated and a formed sheet 53 is transferred to a conveyor 54 which takes the sheet 53 to other locations to undergo further processing, such as trimming and autoclaving. The existence of the poly(ethylene oxide) and clay assist in the interply lamination because they prevent water from being sucked out too fast by vacuum boxes 47 and 49. The operation of a Hatschek machine is also described in U.S. Pat. No. 3,954,555.

EXAMPLE 1

The formulation of 79 fiber-cement boards having the following composition and an average thickness of about ¼ inch were made on a Hatschek machine in accordance with the above-described procedure:

| | |
|---|---|
| Portland cement (Type 1) | 57.45% |
| 120 mesh silica | 31.92% |
| cotton fibers (PS 31) | 5.11% |
| polypropylene fibers (3 denier, ¼ inch long) | 0.63% |
| X2059 clay | 4.79% |
| POLYOX WSR-301 | 0.10% |
| Reten 420 | 0.01% |

First, 430 pounds of Hercules cotton linters PS-31 and 54 pounds of 3 denier polypropylene ¼ inch long were placed in the Ampew disperser practically full of water, and the mixture was stirred for twenty to thirty minutes. Thereafter, the mixture was transferred to the storage tank and sufficient water was added to make a 1% slurry. The mixture was continuously agitated. 900 pounds of Attapulus clay and 3.6 pounds of the Rohm and Haas product known under the trademark TAMOL 850 were added to 8100 pounds of water to disperse the clay. 900 pounds of cement and 500 pounds of 120 mesh silica were mixed in dry mixer 13. Thereafter, from the foregoing the following amounts were mixed together in bach mixer 16: 900 pounds of the cement, 500 pounds of the silica, sufficient fiber slurry from tank 11 to provide 80 pounds of cotton and 10 pounds of polypropylene, sufficient clay dispersion from tank 15 to provide 75 pounds of clay, and sufficient water was added from tank 23 to bring the slurry to 10% solids. After thorough mixing in batch mixer 16, the slurry was fed to stock chest 19, and the bucket feed 20 fed the slurry to feed trough 22. At this point 0.10% by weight of POLYOX WSR-301 was added to the slurry in the feed trough. Also, a sufficient amount of RETEN 420, about 0.01%, was added to the slurry in the feed trough for further flocculation and clarification of discharge water, the amount being determined by the Hatschek machine operator. During formation of the mat, only one cylinder tank, as modified in FIG. 2, was used. The accumulator 53 was rotated ten times to build up a mat of between about 0.25 and 0.30 inches thick. Thereafter, the mats were removed, trimmed, stacked and stored for seven days. Thereafter, the sheets were autoclaved at about 110 psig at about 335° F. for about 20 hours.

The average physical test results after autoclaving for these non-asbestos, fiber reinforced cement sheets were as follows:

| | |
|---|---|
| Modulus of rupture (across machine direction) | 2911 psi (range 2720-3246 psi) |
| Deflection across machine direction before rupture | 0.143 inches |
| Modulus of rupture (with machine direction) | 2346 psi (range 2125-2547 psi) |
| Deflection with machine direction before rupture | 0.133 inches |
| Density | 90 pounds/ft³ |
| Water adsorption | 29% |
| $\left(\frac{\text{saturated wt.} - \text{dry wt.}}{\text{dry wt.}}\right)$ | |
| Shrinkage (saturated length minus dry length) | .018 inches/ft. |

The sheets exhibited good handling properties and physical characteristics comparable to asbestos-cement (type U) flat sheets.

As noted above, sheets may be made with lesser impact resistance by not adding the polypropylene fibers. And, further, the silica can have reground product and/or inert filler, such as calcium carbonate or wollastonite, substituted therefor if there is to be no autoclaving.

EXAMPLES 2-8

The following fibers have been formed into fiber-cement products in accordance with the above teaching, except that the various formulations were laboratory-prepared samples which should be capable of use in fiber-cement products formed on a Hatschek machine because they contain the combination of clay and poly(ethylene oxide) which provide the abovedescribed features. These laboratory-prepared samples were not autoclaved, but were cured in a moist cabinet (approximately 90% relative humidity) at ambient temperature for 28 days before testing.

| SAMPLE NUMBER | INGREDIENTS OF EACH SAMPLE IN PERCENT BY WEIGHT | | | | | | |
|---|---|---|---|---|---|---|---|
| | 2 | 3 | 4 | 5 | 6 | 7 | 8 |
| Cement | 69.7 | 69.7 | 69.7 | 69.7 | 69.7 | 69.7 | 69.7 |
| Silica | 19.0 | 19.0 | 19.0 | 19.0 | 19.0 | 19.0 | 19.0 |
| Jute | 6.34 | 0 | 0 | 0 | 0 | 0 | 0 |
| Kraft | 0 | 6.34 | 0 | 0 | 0 | 0 | 0 |
| Alumina | 0 | 0 | 6.34 | 0 | 0 | 0 | 0 |
| Kevlar | 0 | 0 | 0 | 6.34 | 0 | 0 | 0 |
| AR Glass Fiber | 0 | 0 | 0 | 0 | 6.34 | 0 | 0 |
| Polyester Fiber | 0 | 0 | 0 | 0 | 0 | 6.34 | 0 |
| Cotton PS-31 | 0 | 0 | 0 | 0 | 0 | 0 | 6.34 |
| X2059 Clay | 4.8 | 4.8 | 4.8 | 4.8 | 4.8 | 4.8 | 4.8 |
| POLYOX-WSR 301 | .095 | .095 | .095 | .095 | .095 | .095 | .09 |

| SAMPLE NUMBER | PHYSICAL CHARACTERISTICS | | | | | | |
|---|---|---|---|---|---|---|---|
| | 2 | 3 | 4 | 5 | 6 | 7 | 8 |
| Shrinkage in/ft | 0.051 | 0.052 | 0.044 | 0.054 | 0.041 | 0.049 | 0.054 |
| % Adsorption | 20.0 | 21.3 | 20.7 | 17.7 | 20.7 | 23.5 | 22.5 |
| Density lbs/cu ft | 92.8 | 92.2 | 99.3 | 90.1 | 98.7 | 91.2 | 95.7 |
| Deflection in. | 0.054 | 0.064 | 0.043 | 0.096 | 0.066 | 0.049 | 0.067 |
| Flexural Strength (lbs) | 60 | 82 | 49 | 74 | 61 | 51 | 77 |
| Modulus of rupture psi | 2069 | 2753 | 1970 | 2288 | 2348 | 1688 | 2810 |

The flexural strength and the deflection (at break point) in the above table were determined from a 6 inch span and a 3 inch width with center point loading. This is a standard method for testing laboratory prepared samples (see procedure).

The Jute which was used is that which is commercially available with an average fiber length of about ¼ inch. The Kraft is pulped Kraft paper. The Alumina is an alumina silica refractory fiber available from the Babcock & Wilcox Company under the trademark KAOWOOL. The KEVLAR which was used is an aramid fiber manufactured by DuPont Corpooration known as KEVLAR 29, Type 970. The AR Glass Fiber is alkali resistant glass known as Owens-Corning K792 and it was used in ⅛ inch chopped strands. The Polyester fibers are known under the trademark MINIFIBERS type 6-1525 and they were of ¼ inch length and 1.5 denier. The Cotton which was utilized is known as Hercules cotton linters Type PS31.

EXAMPLE 9

The following formulation was prepared on a Hatschek machine in accordance with the above procedure:

| INGREDIENT | PERCENT BY WEIGHT |
|---|---|
| Portland Cement (Type I) | 68.34 |
| Wollastonite NYAD-G | 24.85 |
| Kuralon VPB 103 | 2.49 |
| Clay X2059 | 4.23 |
| POLYOX-WSR 301 | 0.09 |

Average physical characteristics after normal cure (plant storage under ambient conditions) of 5 weeks:

| | |
|---|---|
| Modulus of rupture (across machine direction) | 4032 psi |
| Deflection across machine direction before rupture | 0.215 in. |
| Modulus of rupture (with machine direction) | 2597 psi |
| Deflection with machine direction before rupture | 0.214 in. |
| Density | 84.6 lbs/ft$^3$ |
| H$_2$O adsorption | 31.9% |
| Shrinkage | 0.026 in/ft |

The wollastonite (CaSiO$_3$) is used to reduce the wet-to-dry dimensional changes in both autoclaved and non-autoclaved products including sheets. The wollastonite can be used by itself as a substitute for silica in existing compositions to produce a product which does not require autoclaving, or it may replace part of the silica. The wollastonite may be present in an amount of between about 10% and 50% by weight where it is used by itself. It may also be present in an amount of between about 15% and 30% by weight where silica and/or fillers are present, and more preferably it may be present in an amount of between about 15% and 25% by weight where silica and/or fillers are present. The wollastonite which has been used is known under the trademark WOLLASTONITE NYAD-G and is a product of Interpace Corporation. Wollastonite is a naturally occurring, non-metallic calcium metasilicate material. It is wholly acicular, with typical aspect ratios of 3:1 to 20:1. The NYAD-G has the highest aspect ratio, typically 15:1 to 20:1, and is the preferred grade although other grades may be used.

In addition to Example 9 which was fabricated on a Hatschek machine, the following Examples 10-17 containing acetalized polyvinyl alcohol fibers were prepared in the laboratory:

| | EXAMPLES OF FORMULATIONS IN % BY WEIGHT | | | | |
|---|---|---|---|---|---|
| | 10 | 11 | 12 | 13 | 14 |
| Type I Cement | 57.82 | 60.00 | 59.36 | 59.54 | 92.34 |
| Silica 120 mesh | 32.12 | 33.33 | 32.98 | 33.08 | 0 |
| KURALON VF 5501 | 5.14 | 3.33 | 2.64 | 0 | 2.64 |
| KURALON VPB 103 | 0 | 0 | 0 | 3.97 | 0 |
| Clay X 2059 | 4.82 | 3.33 | 4.95 | 3.31 | 4.95 |
| POLYOX WSR-301 | 0.10 | 0.10 | 0.06 | 0.10 | 0.07 |
| RETEN 420 | 0.01 | 0.01 | 0.01 | 0.01 | 0.01 |

The physical properties of Examples 11-15 are shown in the following table:

| | PHYSICAL PROPERTIES OF FORMULATIONS 10-14 | | | | |
|---|---|---|---|---|---|
| | 10 | 11 | 12 | 13 | 14 |
| Type Cure | normal | normal | normal | normal | normal |
| Shrinkage Wet to Dry - in./ft. | 0.048 | 0.043 | 0.041 | 0.043 | 0.053 |
| % Absorption | 27.2 | 20.8 | 22.2 | 21.1 | 19.0 |
| Density - lb/ft$^3$ | 87.6 | 96.3 | 99.6 | 98.1 | 106.7 |
| Deflection - in. | 0.321 | 1.122 | 0.136 | 0.063 | 0.173 |
| Modulus of Rupture psi | 4497 | 3939 | 3144 | 3058 | 3457 |

| | EXAMPLES OF FORMULATIONS IN % BY WEIGHT | | |
|---|---|---|---|
| | 15 | 16 | 17 |
| Type I Cement | 68.07 | 69.57 | 68.49 |
| Silica 120 mesh | 0 | 0 | 0 |
| KURALON VF 5501 | 2.48 | 2.53 | 0 |
| KURALON VPB 103 | 0 | 0 | 1.87 |
| Clay X2059 | 4.64 | 2.53 | 4.67 |
| POLYOX WSR-301 | 0.06 | 0.06 | 0.06 |
| RETEN 420 | 0.01 | 0.01 | 0.01 |
| WOLLASTONITE NYAD-G | 24.75 | 25.30 | 24.90 |

The physical properties of Examples 15-17 are shown in the following table:

| | PHYSICAL PROPERTIES OF FORMULATIONS 16-18 | | |
|---|---|---|---|
| | 15 | 16 | 17 |
| Type Cure | normal | normal | normal |
| Shrinkage Wet to Dry - in./ft. | 0.028 | 0.024 | 0.023 |
| % Absorption | 25.5 | 25.7 | 24.4 |
| Density - lb/ft$^3$ | 95.0 | 94.4 | 97.0 |
| Deflection - in. | 0.090 | 0.106 | 0.061 |
| Modulus of Rupture psi | 3929 | 4128 | 3194 |

From the foregoing examples it can be seen that the shrinkage from wet to dry in inches per foot for Examples 10-17 varies between 0.028 and 0.053. This is very acceptable for products which are "normal" cured, which means that they are permitted to air dry for twenty-eight days. The percent of adsorption of Examples 10-17 varies between 19.0 and 25.7, which is within the same range as obtained from a cement-asbestos product. The deflection of Examples 10-17 varies between 0.061 and 0.321. This is greater than that obtained from comparable cement-asbestos products, and therefore shows that the cement-acetalized polyvinyl alcohol products will deflect greater amounts before fracture.

In addition, the modulus of rupture of Examples 10-17 varies between about 3100 psi and 4500 psi which is about the same range as a cement-asbestos product. Thus, it can be concluded that the acetalized polyvinyl alcohol fibers produce cement sheets which are comparable to asbestos sheets. It is also to be noted that the property of impact resistance has also been found to be far superior to asbestos-cement products when approximately 6% by weight of acetalized polyvinyl alcohol fibers were used. It is believed that the source of the higher strength properties of the products of the present invention is due to the mechanical and/or chemical bond to the Portland cement.

The above Examples 2-8 and 10-17 were prepared in the laboratory by the following procedure, and the Examples are believed to be representative of the results which would be obtainable if the compositions within the ranges set forth in the present disclosure were fabricated on a Hatschek machine:

The samples which were tested in accordance with the foregoing examples were made as follows: 1,000 milliliters of water were divided into 2 parts. In one part, any fibers which were used were dispersed by use of a Waring blender, and this portion of the water with the dispersed fibers therein was transferred to a mixing beaker. To the other portion of the water, any of the other solids which were used, such as cement, wollastonite and filler, were added. Thereafter, the second portion of the water was added to the mixing beaker, and at the same time the clay was added as a 10% slurry so that the total amount of water was approximately 1,060 milliliters. The total liquid solid mixture was mixed for 1¾ minutes and thereafter the poly(ethylene oxide) was added and mixing was continued for approximately 10 seconds. Thereafter, the Reten was added and the resultant slurry was poured into a suction box and vacuum drawn to take up the excess water. Thereafter, the pat or sample was removed from the suction box and compressed at 325 psi to form a rest pat which was approximately 3 inches by 8 inches by ¼ inch. It was this test pat or sample which was normal cured or autoclaved to provide the test sample. It will be appreciated that the same procedure, as noted above, was followed when certain of the components were not used, in which event the step referring to the manner in which they were incorporated was eliminated from the above procedure.

While the above description has referred to the formation of the product on a Hatschek machine, it will be understood that the product can be formed on other types of wet-forming machines wherein the slurry is dewatered and picked up on a screen.

While preferred embodiments of the present invention have been disclosed, it will be appreciated that the present invention is not limited thereto but may be otherwise embodied within the scope of the following claims.

What is claimed is:

1. A fiber-cement product comprising Portland cement in an amount of between about 40% and 80% by weight, fibers in an amount of between about 1% and 15% by weight, clay in an amount of between about 2% and 15% by weight, and poly(ethylene oxide) in a sufficient amount to coact with said clay in an aqueous slurry containing said Portland cement, fibers and clay to retain fines in a mat formed from said slurry.

2. A fiber-cement product as set forth in claim 1 including silica in an amount of between about 10% and 40% by weight.

3. A fiber-cement product as set forth in claim 1 including filler in an amount of between about 10% and 40% by weight.

4. A fiber-cement product as set forth in claim 1 including a combination of silica and filler in an amount of between about 10% and 40% by weight.

5. A fiber-cement product as set forth in claim 1 wherein said poly(ethylene oxide) has a molecular weight of between about 900,000 and 5,000,000.

6. A fiber-cement product as set forth in claim 1 wherein said poly(ethylene oxide) is present in an amount of between about 0.03% and 0.5% by weight.

7. A fiber-cement product as set forth in claim 6 wherein said fibers are acetalized polyvinyl alcohol.

8. A fiber-cement product as set forth in claim 1 wherein said poly(ethylene oxide) is present in an amount of between about 0.04% and 0.3% by weight.

9. A fiber-cement product as set forth in claim 8 wherein said fibers are acetalized polyvinyl alcohol.

10. A fiber-cement product as set forth in claim 1 wherein said poly(ethylene oxide) is present in an amount of between about 0.05% and 0.1% by weight.

11. A fiber-cement product as set forth in claim 10 wherein said fibers are acetalized polyvinyl alcohol.

12. A fiber-cement product as set forth in claim 1 wherein said fibers are selected from the group of cotton, sisal, rami, jute, hemp, Kraft, glass, alumina, carbon, mineral fiber, polypropylene, and aramid.

13. A fiber-cement product as set forth in claim 1 wherein said fibers are cotton and polypropylene.

14. A fiber-cement product as set forth in claim 13 wherein said cotton is present in an amount of between about 2% and 10% by weight and the polypropylene is present in an amount of between about 0.3% and 2% by weight.

15. A fiber-cement product as set forth in claim 13 wherein said cotton is present in an amount of between about 5% and 7% by weight and said polypropylene is present in an amount of between about 0.5% and 1% by weight.

16. A fiber-cement product as set forth in claim 1 wherein said Portland cement is present in an amount of between about 55% and 65% by weight, and wherein said fibers are present in an amount of between about 5% and 7% by weight, and wherein said clay is present in an amount of between about 4% and 7% by weight, and wherein said poly(ethylene oxide) is present in an amount of between about 0.05% and 0.1% by weight.

17. A fiber-cement product as set forth in claim 16 wherein said fibers comprise cotton amd polypropylene.

18. A fiber-cement product as set forth in claim 16 wherein said fibers are acetalized polyvinyl alcohol.

19. A fiber-cement product as set forth in claim 18 wherein said acetalized polyvinyl alcohol fibers are present in an amount of between about 2% and 5%.

20. A fiber-cement product as set forth in claim 16 including silica in an amount of between about 20% and 35% by weight.

21. A fiber-cement product as set forth in claim 20 wherein said poly(ethylene oxide) has a molecular weight of between about 90,000 and 5,000,000.

22. A fiber-cement product as set forth in claim 1 wherein said clay is present in an amount of between about 3% and 10% by weight.

23. A fiber-cement product as set forth in claim 22 wherein said poly(ethylene oxide) is present in an amount of between about 0.03% and 0.5% by weight.

24. A fiber-cement product as set forth in claim 22 wherein said poly(ethylene oxide) is present in an amount of between about 0.04% and 0.3% by weight.

25. A fiber-cement product as set forth in claim 22 wherein said poly(ethylene oxide) is present in an amount of between about 0.05% and 0.1% by weight.

26. A fiber-cement product as set forth in claim 1 wherein said clay is present in an amount of between about 4% and 7% by weight.

27. A fiber-cement product as set forth in claim 26 wherein said poly(ethylene oxide) is present in an amount of between about 0.03% and 0.5% by weight.

28. A fiber-cement product as set forth in claim 26 wherein said poly(ethylene oxide) is present in an amount of between about 0.04% and 0.3% by weight.

29. A fiber-cement product as set forth in claim 26 wherein said poly(ethylene oxide) is present in an amount of between about 0.05% and 0.1% by weight.

30. A fiber-cement product as set forth in claim 1 including wollastonite in an amount of between about 10% and 40% by weight.

31. A fiber-cement product as set forth in claim 30 wherein said fibers comprise acetalized polyvinyl alcohol fibers.

32. A fiber-cement product as set forth in claim 1 including wollastonite in an amount of between about 15% and 35% by weight.

33. A fiber-cement product as set forth in claim 32 wherein said fibers comprise acetalized polyvinyl alcohol fibers.

34. A fiber-cement product as set forth in claim 33 wherein said acetalized polyvinyl fibers are present in an amount of between about 2% and 10% by weight.

35. A fiber-cement product as set forth in claim 32 wherein said poly(ethylene oxide) is present in an amount of between about 0.03% and 0.5% by weight.

36. A fiber-cement product as set forth in claim 35 wherein said clay is present in an amount of between about 3% and 10% by weight.

37. A fiber-cement product as set forth in claim 35 wherein said clay is present in an amount of between about 4% and 7% by weight.

38. A fiber-cement product as set forth in claim 32 wherein said poly(ethylene oxide) is present in an amount of between about 0.04% and 0.3% by weight.

39. A fiber-cement product as set forth in claim 38 wherein said clay is present in an amount of between about 3% and 10% by weight.

40. A fiber-cement product as set forth in claim 38 wherein said clay is present in an amount of between about 4% and 7% by weight.

41. A fiber-cement product as set forth in claim 32 wherein said poly(ethylene oxide) is present in an amount of between about 0.05% and 0.1% by weight.

42. A fiber-cement product as set forth in claim 41 wherein said clay is present in an amount of between about 3% and 10% by weight.

43. A fiber-cement product as set forth in claim 41 wherein said clay is present in an amount of between about 4% and 7% by weight.

44. A fiber-cement product as set forth in claim 1 wherein said poly(ethylene oxide) is present in an amount of at least about 0.03% by weight.

45. A fiber-cement product as set forth in claim 1 wherein said clay is of the Attapulgus type.

46. A fiber-cement product as set forth in claim 1 wherein said fibers comprise acetalized polyvinyl alcohol fibers.

47. A fiber-cement product as set forth in claim 46 wherein said acetalized polyvinyl alcohol fibers are present in an amount of between about 2% and 10% by weight.

48. A fiber-cement product as set forth in claim 46 wherein said acetalized polyvinyl alcohol fibers are present in an amount of between about 2% and 5% by weight.

49. A fiber-cement product comprising Portland cement in an amount of between about 40% and 80% by weight, fibers other than asbestos, and clay and poly(ethylene oxide) in relatively sufficient amounts to maintain said fibers in suspension in an aqueous slurry containing said fibers and Portland cement and to retain a larger amount of fines in a mat formed from said slurry than can be retained by the use of said poly(ethylene oxide) by itself.

50. A fiber-cement product as set forth in claim 49 wherein said clay is present in an amount of at least 2% by weight.

51. A fiber-cement product as set forth in claim 50 wherein said clay is of the Attapulgus type.

52. A fiber-cement product as set forth in claim 50 wherein said poly(ethylene oxide) is present in an amount of at least 0.03% by weight.

53. A fiber-cement product as set forth in claim 49 wherein said poly(ethylene oxide) is present in an amount of at least 0.03% by weight.

54. A fiber-cement product as set forth in claim 50 wherein said fibers comprise acetalized polyvinyl alcohol fibers.

55. A fiber-cement product as set forth in claim 54 wherein said acetalized polyvinyl alcohol fibers are present in an amount of at least 1% by weight.

56. A fiber-cement product as set forth in claim 55 wherein said poly(ethylene oxide) is present in an amount of at least 0.03% by weight.

57. A fiber-cement product as set forth in claim 55 including wollastonite in a sufficient amount to reduce wet-to-dry dimensional changes relative to similar compositions which do not contain wollastonite.

58. A fiber-cement product as set forth in claim 57 wherein said wollastonite is present in an amount of at least about 10% by weight.

59. A fiber-cement product as set forth in claim 49 wherein said fibers comprise cotton.

60. A fiber-cement product as set forth in claim 49 wherein said fibers comprise cotton and polypropylene.

61. A fiber-cement product as set forth in claim 49 including wollastonite in a sufficient amount to reduce wet-to-dry dimensional changes relative to similar compositions which do not contain wollastonite.

62. A fiber-cement product comprising Portland cement in an amount of between about 40% and 80% by weight, fibers other than asbestos in an amount of at least about 1% by weight, poly(ethylene oxide), and clay in an amount of at least about 2% by weight to coact with said poly(ethylene oxide) in an aqueous slurry containing said Portland cement, fibers and poly(ethylene oxide) to provide a sufficiently high drainage time for proper formation of a mat on a screen and a smaller solids loss than can be obtained by the use of said poly(ethylene oxide) by itself.

63. A fiber-cement product as set forth in claim 62 wherein said poly(ethylene oxide) is present in an amount of at least about 0.03% by weight.

64. A fiber-cement product as set forth in claim 62 wherein said fibers comprise cotton.

65. A fiber-cement product as set forth in claim 62 wherein said fibers comprise cotton and polypropylene.

66. A fiber-cement product as set forth in claim 62 wherein said fibers comprise acetalized polyvinyl alcohol fibers.

67. A fiber-cement product as set forth in claim 66 including wollastonite.

* * * * *